United States Patent [19]

Goletto et al.

[11] 4,384,111

[45] May 17, 1983

[54] HEXAMETHYLENEDIAMINE/ADIPIC ACID/DIMER ACID COPOLYAMIDE

[75] Inventors: Jean Goletto, Ecully; Jean Coquard, Grezieu la Varenne, both of France

[73] Assignee: Rhone-Poulenc Industries, Paris, France

[21] Appl. No.: 162,491

[22] Filed: Jun. 24, 1980

[30] Foreign Application Priority Data

Jun. 26, 1979 [FR] France ................................. 79 17264

[51] Int. Cl.$^3$ .............................................. C08G 69/26
[52] U.S. Cl. .................................... 528/339.3; 528/336
[58] Field of Search ................... 260/18 N; 528/339.3, 528/339.5

[56] References Cited

U.S. PATENT DOCUMENTS 2,149,286  3/1939  Graves ............................... 260/18 N
3,499,853  3/1970  Griebsch et al. ................. 260/18 N Primary Examiner—Harold D. Anderson Attorney, Agent, or Firm—Burns, Doane, Swecker & Mathis

[57] ABSTRACT

Flexible, homogeneous and transparent copolyamides comprise the polycondensation products of adipic acid, fatty acid dimer and hexamethylenediamine, the molar ratio of weight adipic acid to weight of total acid in each ranging from about 0.5 to 0.99, and that point obtained by plotting, along the abscissa, such molar fraction of adipic acid versus, along the ordinate, any individual copolyamide melting point, falling within that area A B C D outlined on the attached FIGURE of Drawing. The subject copolyamides are prepared either by polycondensing a homogenized prepolymer thereof, or by directly copolycondensing a homogeneous, inert solvent solution of monomers. The homogeneous and transparent copolyamides exhibit improved flexibility and high tenacity coupled with good resistance to hydrolysis and good heat resistance, with the copolyamides being useful for providing shaped articles such as moldings, films or filaments of marked uniformity via injection molding, extrusion or spinning.

9 Claims, 1 Drawing Figure

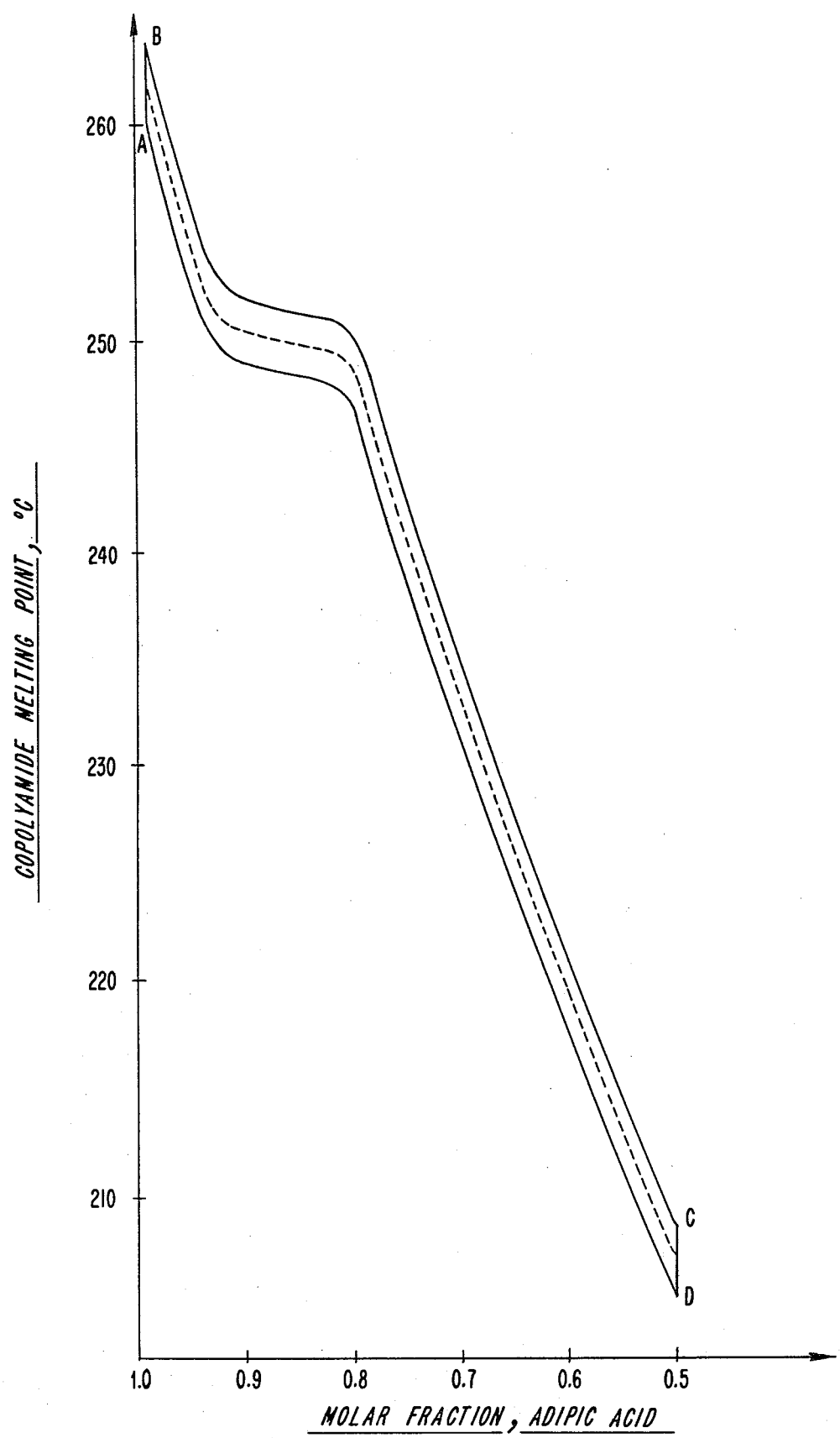

HEXAMETHYLENEDIAMINE/ADIPIC ACID/DIMER ACID COPOLYAMIDE

BACKGROUND OF THE INVENTION

1. Field of the Invention

The present invention relates to novel homogeneous copolyamides based on hexamethylenediamine, adipic acid and fatty acid dimers, and also to certain specific processes for the preparation thereof.

2. Description of the Prior Art

A wide variety of end uses for the various plastics require polymers possessing a particular set of chemical and physical properties, certain of which are characteristic of the polyamides. To the chemical resistance and the tensile strength properties of conventional polyamides, namely, good elongation and good energy absorption, it may be necessary to impart a certain degree of flexibility. A large number of copolymers have been proposed for this purpose, but it is indeed rare to realize all of the desired properties, as the modification required to improve one particular property results in a deterioration in another property.

One advance to the art was made by proposing flexible copolymers based on caprolactam, fatty acid dimers and hexamethylenediamine, which combine, with good flexibility, a tensile strength of more than 5 DaN/mm² (deca Newtons per square millimeter) and good resistance to water (compare English Patent Application No. 2 006 799

Certain applications may also require copolymers having a better heat resistance and hence, higher melting points. Various experiments had been carried out in accordance with known processes in order to obtain copolyamides based on poly(hexamethylenediamine adipate) and possessing the desired properties, but the homogeneity of the resultant copolymers was always problematical.

SUMMARY OF THE INVENTION

Accordingly, a major object of the present invention is the provision of novel, flexible and homogeneous copolyamides based on adipic acid, dimers of fatty acids and hexamethylenediamine, which copolyamides are characterized in that the molar ratio of adipic acid to the total amount of acids therein is between 0.5 and 0.99 and in that the point obtained by plotting, as the abscissa, the molar fraction of adipic acid and, as the ordinate, the melting point of the copolyamide, determined by differential microcalorimetry utilizing a temperature variation of 10° C. per minute, falls within the area A B C D illustrated on the accompanying FIGURE of Drawing.

BRIEF DESCRIPTION OF THE DRAWING

The FIGURE of Drawing is a graph obtained by plotting, as the abscissa, the molar fractions of adipic acid to total acid comprising the subject copolyamides versus, as the ordinate, the melting points of such copolyamides.

DETAILED DESCRIPTION OF THE INVENTION

By the term "flexible copolyamide" as utilized herein, there is intended a copolyamide having a flexural modulus substantially less (by example, between 1 to 10 times less) than that of the conventional polyamides, such as poly(hexamethyleneadipamide) or polycaprolactam, and is on the order of, or even less than, the flexural modulus of the polyamides heretofore considered as flexible, such as, for example, polyundecanamide.

And by the term "homogeneous copolyamide" as utilized herein, there is intended a copolymer which has only one phase in the molten state or in the solid state, as can be observed, for example, by scanning electron microscopy, the possible disperse phase being developed by fixing with phosphotungstic acid.

A much simpler means of determining this homogeneity consists of visually observing the state of transparency of, on the one hand, a molten mass having a thickness of about 0.2 to 0.5 cm and heated to a temperature which is at least 10° C. above its melting point, and, on the other hand, a film or rod obtained from this molten mass after rapid cooling, for example, by immersion in water at ambient temperature. An absolutely transparent film or rod is indicative of perfect homogeneity of the polymer; a film or rod which possesses turbid regions or which is translucent connotes a degree of heterogeneity; a white film containing streaks or inclusions (for example, "fish eyes") connotes significant heterogeneity.

A different method for determination of the homogeneity, which is melting point oriented, as will be explained hereinafter, is preferred to the aforesaid optical test, the assessment of which is in part subjective.

By "dimeric acids" there is intended polymeric fatty acids obtained by fractionation of polymerized fatty acids and containing more than about 95% by weight of dimers. By "fatty acids" there is intended saturated or unsaturated aliphatic monoacids having from 8 to 24 carbon atoms.

Among the linear or branched chain saturated fatty acids, exemplary are caprylic, pelargonic, capric, lauric, myristic, palmitic, isopalmitic, stearic, arachidic, behenic and lignoceric acid.

Among the linear or branched chain fatty acids having ethylenic unsaturation, exemplary are oct-3-enoic, dodec-11-enoic, lauroleic, myristoleic, palmitoleic, gadoleic, cetoleic, linoleic, linolenic, eicosatetraenoic and chaulmoogric acid. Certain acids having acetyleneic unsaturation can also provide polymeric acids, but such do not occur to an interesting degree in nature and for this reason are of very little economic interest.

The polymeric fatty acids obtained by polymerization, most commonly in the presence of peroxides or of Lewis acids, can be fractionated. They can also by hydrogenated to reduce their degree of unsaturation and hence to reduce their color.

The most commonly used starting materials are compositions resulting from hydrogenated oleic and linoleic acid and containing:

(i) from 1 to 15% by weight of monobasic acid,
(ii) from 80 to 90% by weight of dibasic acid, and
(iii) from 1 to 25% by weight of tribasic acid or acid of even higher basicity.

For producing copolyamides according to the invention, it is advantageous to use compositions wherein the dimeric acid fraction constitutes more than 95% by weight. Dimeric acids in which the content of monofunctional acid is less than 0.5% by weight and in which the content of acid having a functionality of greater than 2 is less than 5% by weight are preferred.

The molar percentage of adipic acid relative to the total amount of acids, namely, adipic acid plus dimeric acids, is greater than 50% if it is desired to obtain copolymers having a high melting point. This percentage is, however, less than 99% if it is desired to retain the flexibility imparted by the dimeric acids. It is apparent that in the range of copolymers obtained by varying the proportion of adipic acid from 99% to 50%, products of greater or lesser flexibility, and of different levels of melting point, are obtained. The products in which the molar fraction of adipic acid is between 0.95 and 0.80 are of particular value because they have both a high melting point and good flexibility.

It has in fact been determined that the melting points of the homogeneous copolyamides according to the invention are located on a defined curve or, more precisely, taking into account possible scatter or experimental error due to the method of determination of the melting points and the actual nature of the copolyamides, are located within a zone or area circumscribed by curves representing a scatter of ±2° C. relative to the mean theoretical curve of the melting points. This area A B C D is plotted on the attached FIGURE of Drawing.

The molar fraction of adipic acid is plotted as the abscissa and the melting point of the copolymer, measured by means of a differential microcalorimeter, utilizing a temperature variation of 10° C. per minute, is plotted as the ordinate.

The homogeneous copolyamides according to the invention exhibit a single melting point, which is located within the area A B C D. The heterogeneous copolyamides differ from the above either in having a single melting point which is, however, significantly higher than that expected and hence is outside the area A B C D, or in having two melting points, of which one is close to the melting point of polyhexamethylene adipamide.

Another object of the invention is the novel processes for obtaining the flexible and homogeneous copolyamides having a molar ratio of adipic acid, to total acids employed, of between 0.5 and 0.99.

In fact, neither the conventional processes of polycondensation of the polyamides nor the particular process claimed in French Pat. No. 1,395,076 for the preparation of a copolyamide based on adipic acid (molar fraction less than 0.5), a dimeric acid and hexamethylenediamine can be utilized for the preparation of copolyamides according to this invention.

With the above two types of processes, the copolymers obtained are in fact heterogeneous and have physical properties which are difficult to reproduce and are unsuited for spinning or extrusion operations.

It has now been found, however, that it is possible to prepare homogeneous copolyamides according to the invention by preparing prepolymers, in a heterogeneous medium, from a mixture of adipic acid, a dimeric acid and hexamethylenediamine, or from their corresponding salts, these prepolymers being subsequently homogenized under conditions such that the state of equilibrium of the amidification reactions remains unchanged, after which the homogeneous prepolymers thus obtained are converted to high molecular weight polycondensates.

In a first process, the starting material consists of compositions containing either adipic acid, dimeric acids and hexamethylenediamine, or the salt of adipic acid with hexamethylenediamine and the salt of a dimeric acid with hexamethylenediamine, or one of the salts and the constituents of the other salt in their free state, the amounts of the constituents of the starting material composition being such that the contents of amine groups and of carboxylic acid groups do not differ by more than 5% and preferably do differ by more than 1%.

If it is desired that the process be perfectly reproducible, it is of value to conduct the reaction as nearly as possible, with stoichiometric compositions.

It too has been found that in order to obtain the novel copolyamides, having a high adipic acid content, according to the invention, it is indispensable and critical to carry out a homogenization stage for about 30 minutes to 5 hours at a high temperature (on the order of 280° C.) under a high water vapor pressure (on the order of 20 bars).

The conditions of the homogenization stage are also critical. The parameters to consider are the proportion of adipic acid, the temperature, the pressure and the duration of this stage; these parameters are not independent.

For a given proportion of adipic acid (which varies in molar terms, from 0.5 to 0.99), the duration of homogenization under uniform stirring can vary from 30 minutes to about 5 hours and preferably varies from 1 hour to 4 hours. This duration is a function of the temperature and of the pressure. The temperature is between 270° C. and 290° C. The water vapor pressure is itself between 13 and 25 bars, preferably between 15 and 20 bars.

The aforenoted ranges reflect those conditions which are industrially the most profitable, but it will be apparent that it is possible to achieve good homogenization by selecting a value for one parameter outside the values set forth and by compensating the resulting effect by varying another parameter.

It is indispensable and critical that during this stage there should be no significant shift in the equilbrium of the amidification reactions. This condition is achieved by preventing any loss or escape of volatiles.

The method for carrying out the process comprises a certain number of successive stages which are described below, without implying any limitation.

The salt of the dimeric acid and of hexamethylenediamine is not compatible with the aqueous hexamethylenediamine adipate solutions. In order to initially achieve a stoichiometric ratio between the dimeric acid and the hexamethylenediamine, which stoichiometric ratio is necessary to obtain high molecular weight polymers, it is possible either to precisely weigh out reactants having a purity which is known completely at the time of use (a method which is difficult to employ industrially), or to produce the salt of the dimeric acid in an alcoholic solution, the pH of which can then be adjusted (a method which results in more colored copolyamides).

A variant of this first process, which is readily industrially applicable and makes it possible to achieve the intial stoichiometric proportions of adipic acid, dimeric acid and hexamethylenediamine, consists of preparing an emulsion of the salt of the dimeric acid with hexamethylenediamine in an aqueous solution of hexamethylenediamine adipate, the stoichiometric proportions being checked or monitored by measuring the pH of sample solutions obtained by diluting the emulsion with an alcohol.

The composition of the starting materials, thus prepared, is placed under an inert atmosphere and is then brought gradually and uniformly to the state of chemical equilibrium corresponding to the start of the next stage. A particularly suitable method consists of heating the composition under autogeneous pressure in such a manner as to bring same to the pressure which will be retained for the subsequent homogenization stage. Thereafter, the temperature is gradually adjusted to that selected for the homogenization stage, by gradually distilling water therefrom.

The next stage is the homogenization stage described hereinabove.

The final stage enables completion of the polycondensation in accordance with known methods.

For example, it is possible to carry out a gradual decompression, with simultaneous distillation of the residual water and possible reduction of the temperature to that selected for the "cooking", i.e., the heat treatment which affords the final polymer. The temperature corresponding to this stage is in general between 260° and 290° C. and preferably between 275° and 285° C. The pressure can be atmospheric pressure or a lower pressure. The copolyamide is finally isolated by extrusion under an inert gas pressure of 1 to 5 bars.

A second process has been developed which does not require operating under a high pressure, though a certain pressure can nevertheless be of technological value. The choice of the starting materials is very wide.

The principle of this process consists in producing, at a high temperature, a prepolymer possessing terminal carboxylic acid groups or amine groups, and having a mean molecular weight of less than 10,000 and preferably less than 5,000. This prepolymer is then subjected to a homogenization stage at between 265° C. and 290° C., preferably between 270° C. and 285° C., for a period of time which depends upon the temperature selected and upon the composition of the polymer, but generally varies between 10 minutes and about 2 hours.

The prepolymer obtained upon completion of this stage is maintained at a temperature of between 260° C. and 290° C. during the gradual addition of the reactant or of a mixture of the reactants present in insufficient amount, until a copolycondensate having the desired viscosity is obtained.

Though it is possible to produce a prepolymer with terminal groups essentially of the amine type, it is generally preferred to produce a prepolymer with terminal groups essentially of the carboxylic acid type, for which prepolymer the danger of branching by secondary reactions is less. In this latter case, it is possible, over the course of the reaction in which the condensation is completed, to arrive at the stoichiometric ratio or, where appropriate, to obtain copolyamides containing a small proportion of terminal acid groups, which is preferable, or even to exceed the stoichiometric ratio and arrive at copolyamides containing a small proportion of terminal amine groups, the products obtained then, however, being chemically less stable.

This adjustment of the viscosity is advantageously achieved by "in situ" measurement of the resistance torque of the stirrer of the polymerization reactor. The hexamethylenediamine can be added either in the molten form or in the form of an aqueous solution. However, in this case, the addition must be very gradual and must be made in such a manner that it does not cause a significant lowering of the material temperature.

As indicated above, one of the advantages of this second process consists in the wide variety of starting materials which can be used.

Thus, it is possible to start with a mixture of adipic acid, dimeric acid and hexamethylenediamine, the latter product being present in a deficiency of at least 5% and preferably of about 5 to 20% by weight relative to the amount theoretically required to achieve the stoichiometric ratio.

It is also possible to start with a mixture of the hexamethylenediamine salt of adipic acid, the dimeric acid, and hexamethylenediamine in a deficiency of at least 5% and preferably of 5 to 20% by weight, as above.

An interesting variant, on a practical level, consists of dispersing the adipic acid, in a first stage, in the dimeric acid at a temperature of between 130° and 150° and then adding the molten hexamethylenediamine. This provides a very well-dispersed reaction mixture.

It is also possible to start with the composition employed in the first process, which consists of an emulsion of the salt of the dimeric acid with hexamethylenediamine in an aqueous solution of hexamethylenediamine adipate; it is then necessary to add to the composition an excess of adipic acid or of dimeric acid in order to bring about the conditions which make it possible to obtain, in a first stage, a prepolymer having terminal carboxylic acid groups.

A third type of process has also been developed, which consists of producing the prepolymer of the copolyamide in a homogeneous phase at a temperature of between 150° and 300° C., preferably between 190° C. and 250° C. This homogeneous-stage condition can be achieved by adding a solvent, exhibiting a certain number of properties, to the initial reaction mixture.

According to this process, it is above all of value to start with a reaction mixture consisting essentially of adipic acid, the dimeric acid and hexamethylenediamine, or of their corresponding salts, with the contents of amine groups and of carboxylic acid groups not differing by more than 5% and preferably not differing by more than 1%.

The solvent used must be inert towards the base reactants and the amidification reactions. Its physical characteristics, in particular its boiling point, must be compatible with the high temperature conditions required for the amidification reactions. Thus, this solvent should advantageously have a boiling point of between 170° C. and 250° C. It has been found that N-methylpyrrolidone provides particularly valuable results, and is the solvent of choice.

The prepolymer thus obtained is subsequently converted to final product by heating at a temperature of between 200° C. and 290° C., during which heating the greater proportion of the solvent is removed by distillation.

The residual amounts of solvent can be removed upon completion of this stage, by placing the mixture under vacuum.

It too will be apparent that in all of the processes according to the invention, described above, the composition of the starting reactants can also contain various additives commonly used in the preparation of the conventional polyamides. These additives are, in particular, chain terminators, such as, principally, the monocarboxylic acids, as, for example, acetic acid, nucleating agents and stabilizers of various types.

It is also within the ambit of the invention to employ compositions which, in addition to the three essential constituents, contain minor amounts of other polyamide-forming reactants, which may either be diacids or diamines or aminoacids or lactams.

The process according to the invention enables preparation of homogeneous copolyamides which also exhibit improved flexibility and high tenacity coupled with good resistance to hydrolysis and good heat resistance. Since they are completely homogeneous, such copolyamides have improved transparency and can be employed in conjunction with the usual techniques of injection molding, extrusion or spinning, to provide useful shaped articles, such as moldings, films or filaments, of very marked uniformity.

In order to further illustrate the present invention and the advantages thereof, the following specific examples are given, it being understood that same are intended only as illustrative and in nowise limitative.

EXAMPLE 1

Preparation of the salt of the dimeric acid with hexamethylenediamine, in emulsion, in an aqueous solution of hexamethylenediamine adipate:

The following constituents were introduced into a 3 liter glass reactor equipped with a stirrer and maintained under a slight stream of nitrogen:

Crystalline hexamethylenediamine adipate (N-salt): 834.6 g (3.185 mols), and

Deionized water: 1150 g.

The mixture was stirred at 25° C. until the N-salt had completely dissolved.

The following constituents were then introduced thereto:

Crystalline hexamethylenediamine: 80.6 g (0.695 mol), and

Deionized water: 181 g.

This mixture was stirred at 25° C. until the hexamethylenediamine had completely dissolved. The following constituents were then slowly introduced, under stirring:

421.7 g of dimeric acid marketed under the trademark Empol 1010 (≈0.74 mol) and containing, by weight, 0.05% of monomer and 95.55% of dimer. The 95.55% of dimer is present essentially in the form of a mixture of isomers having 36 carbon atoms, with the principal isomer having the structural formula:

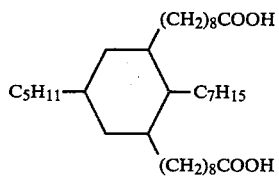

Empol 1010 further contains about 4.4% by weight of polymers having a degree of polymerization greater than 2. The emulsion was stirred for 2 hours.

20 g of emulsion were taken and diluted with 17.8 g of a water/isopropanol mixture (21.9:78.1 by weight). The pH of the solution, at 20° C., was 7.63 (measured on a 10% strength solution of the dimeric acid salt in a mixture of N-salt/water/isopropanol (18.4:40.8:40.8 by weight).

14 g of a 30% strength aqueous solution of hexamethylenediamine were added, the mixture was stirred for one hour and the pH was checked on a 20 g sample, as above. The pH at 20° C. was 8.40 and corresponded, to within about ±0.1 pH unit, to the pH for the stoichiometric ratio, determined by means of a pH-meter under the same conditions in respect of concentrations and of solvent.

Such provided an emulsion which was rather stable at 25° C., had a solids content of 50%, and contained a mixture of N-salt and the salt of a dimeric acid in the ratio of 62.2:37.8 by weight; the emulsion could be used directly for the preparation of the novel copolyamides according to the invention.

EXAMPLE 2

The general procedure for preparing the novel copolyamides according to the invention was as follows.

The process was carried out in a stainless steel autoclave which was stirred and was equipped for operation at up to 300° C. under 25 bars of pressure.

The reactants were introduced cold into the apparatus. These reactants were either:

| | |
|---|---|
| process (a) | A 50% strength aqueous solution of N—salt<br>+ a 30% strength aqueous solution of hexamethylenediamine<br>+ the weighed stoichiometric amount of dimeric acid<br>+ the chain terminator (either excess dimeric acid or acetic acid in aqueous solution) |
| or | |
| process (b) | an emulsion of the same type as that used in Example 1<br>+ if required, a 50% strength aqueous solution of N—salt (to adjust the copolymer composition)<br>+ the chain terminator. |

The apparatus was purged with nitrogen and the temperature of the mixture was then raised to 225° C. while maintaining the autogenous pressure. A pressure of 20 bars was reached. Water was distilled under pressure for 1 hour, so as to impart a high temperature to the mixture, namely $\theta°$ C. The distillation was stopped in order to carry out the homogenization stage, lasting x minutes at $\theta°$ C., under P bars water vapor pressure.

The pressure was decreased to atmospheric pressure over the course of 30–90 minutes, while maintaining the temperature at $\theta°$ C.

The polymer, the stirring of which was commenced when the mterial temperature exceeded 250° C., was maintained under stirring at $\theta°$ C. under atmospheric pressure for 30 minutes, extruded under nitrogen pressure (2–6 bars), cooled in water and then granulated.

The characteristics of the polymers obtained are summarized in the Tables which follow.

The melting points (TF° C.) and crystallization points during cooling (TC° C.) were determined by differential microcalorimetry (10° C./minute, under nitrogen).

The inherent viscosities were determined at 25° C. in a solution of strength 0.5 g/100 ml in m-cresol.

$$\eta_{inh.} = (1/C) \log (t/t_o)$$

t = flow time of the solution
$t_o$ = flow time of the pure solvent
C = concentration in g/dcl The NH$_2$ group contents were determined by titrating a solution of the polymer in a 90:10 mixture of phenol and water with potassium hydroxide in glycol, in the presence of phenolphthalein.

The contents of COOH groups were determined by titrating a solution of the polymer in benzyl alcohol at 200° C. with potassium hydroxide in glycol, in the presence of phenolphthalein.

These two contents are expressed in milliequivalents per kg (meq/kg).

TABLE I

| EXAMPLE | COMPOSITION OF THE COPOLYAMIDES: MOLAR FRACTION OF ADIPIC ACID IN THE MIXTURE OF ACIDS | CHAIN TERMINATOR NATURE | CHAIN TERMINATOR CONTENT MOL % OF SALTS | CONDITIONS OF THE HOMOGENIZATION STAGE θ °C. | CONDITIONS OF THE HOMOGENIZATION STAGE P bars | CONDITIONS OF THE HOMOGENIZATION STAGE × MINUTES |
|---|---|---|---|---|---|---|
| 2A | 0.742 | 0 | 0 | 285 | 18 | 0 |
| 2B | 0.87 | 0 | 0 | 275 | 18 | 0 |
| 2C | 0.656 | 0 | 0 | 280 | 18 | 120 |
| 2D | 0.742 | 0 | 0 | 280 | 18 | 60 |
| 2E | " | 0 | 0 | 280 | 20 | 60 |
| 2F | " | 0 | 0 | 280 | 20 | 90 |
| 2G | " | 0 | 0 | 280 | 20 | 120 |
| 2H | " | 0 | 0 | 280 | 20 | 120 |
| 2I | 0.812 | 0 | 0 | 280 | 20 | 120 |
| 2J | 0.842 | 0 | 0 | 280 | 20 | 120 |
| 2K | | 0 | 0 | 280 | 20 | 240 |
| 2L | 0.87 | 0 | 0 | 280 | 20 | 60 |
| 2M | " | 0 | 0 | 280 | 20 | 120 |
| 2N | " | Dimer | 0.05 | 280 | 20 | 120 |
| 2O | " | Dimer | 0.05 | 280 | 20 | 120 |
| 2P | 0.92 | 0 | 0 | 280 | 20 | 90 |
| 2Q | " | 0 | 0 | 280 | 20 | 120 |
| 2R | " | 0 | 0 | 280 | 20 | 180 |
| 2S | 0.963 | 0 | 0 | 280 | 20 | 180 |
| 2T | " | 0 | 0 | 280 | 20 | 240 |
| 2U | 0.982 | 0 | 0 | 280 | 20 | 240 |

TABLE II

CHARACTERISTICS OF THE COPOLYAMIDE

| EXAMPLE | Appearance | Tf °C. | Tc °C. | $\eta_{inh.}$ dcl/g | COOH meq/Kg | NH$_2$ meq/Kg |
|---|---|---|---|---|---|---|
| 2A | Heterogeneous | 260 | | | | |
| 2B | Heterogeneous | 260 | | 1.089 | | |
| 2C | Homogeneous | 225 | 170 | 0.971 | 80 | 29 |
| 2D | Heterogeneous | 250 | 195 | | 80 | 26 |
| 2E | Heterogeneous | 250 | 202 | 0.967 | 83.7 | 36 |
| 2F | Almost Homogeneous | 248 | 297 | 0.997 | 60.2 | 53 |
| 2G | Homogeneous | 236 | 184 | 0.987 | 70 | 56.8 |
| 2H | Homogeneous | 237 | 186 | 1.12 | 58.4 | 46.3 |
| 2I | Homogeneous | 245 | 195 | 1.157 | 77.75 | 37.8 |
| 2J | Homogeneous | 247 | 198 | 1.054 | 94.6 | 32.7 |
| 2K | Homogeneous | 246 | 198 | 1.034 | 78.6 | 84.0 |
| 2L | Heterogeneous | 257 | 206 | 1.21 | 73 | 43.8 |
| 2M | Homogeneous | 248 | 200 | 1.09 | 75.7 | 56 |
| 2N | Homogeneous | 247 | 201 | 1.1 | 63.3 | 64.3 |
| 2O | Homogeneous | 248 | 205 | 1.08 | 69.5 | 53.6 |
| 2P | Heterogeneous | 254 | 211 | 1.13 | 70.4 | 50 |
| 2Q | Heterogeneous | 255 | 200 | 1.08 | 58 | 65.5 |
| 2R | Homogeneous | 247 | 205 | 1.22 | 51.4 | 79.5 |
| 2S | Heterogeneous | 254 | 205 | 1.22 | 58.9 | 79.3 |
| 2T | Homogeneous | 254 | 209 | 1.25 | 71.4 | 64.7 |
| 2U | Homogeneous | 257 | 211 | 1.21 | 75.8 | 62.3 |

Examples 2C, 2G, 2H, 2I, 2J, 2K, 2M, 2N, 2O, 2R, 2T and 2U illustrate the preparation and certain characteristics of the novel copolyamides. It will be noted that for a temperature of 280° C. and a vapor pressure of 20 bars, the duration of the homogenization stage must be increased from about 2 hours to about 4 hours as the molar fraction of adipic acid is increased from 0.65 to 0.98.

Examples 2A and 2B reflect that the process used for polyamide 6,6 was unsuccessful in obtaining homogeneous copolyamides derived from adipic acid and dimeric acid and having a molar fraction of adipic acid >0.5.

Examples 2D, 2E, 2F, 2L, 2P, 2Q and 2S illustrate that inadequate homogenization conditions also lead to nonhomogeneous copolyamides with molar fractions of adipic acid >0.5.

EXAMPLES 3

Polycondensation beginning with the base reactants and employing acidolysis:

The process was carried out in a 1 liter stainless steel autoclave equipped with a stirrer which can revolve at 50 rpm, and a dropping funnel, thermostatically maintained at 80° C., for introducing the supplementary amount of hexamethylenediamine.

Charges:
(i) 169.65 g (1.161 mols) of pure adipic acid;
(ii) 253 g (0.443 mol) of dimeric acid; and
(iii) 167.55 g (1.444 mols) of hexamethylenediamine, i.e., 90% of the theoretical amount required for achieving the stoichiometric ratio.

The adipic acid and dimeric acid were charged cold into the autoclave.

The mixture was stirred at 15 rpm and was flushed 6 times with nitrogen under a pressure of 8 bars.

The temperature of the mixture was gradually raised to 150° C.

Same was then stirred at 50 rpm and the molten hexamethylenediamine was introduced therein over the course of 20 minutes.

Thereafter, the temperature of the reaction mixture was raised to 285° C. over the course of about 45 minutes and was maintained at this temperature for 1 hour. 17 g of molten hexamethylenediamine (0.146 mol) was then introduced over the course of 10 minutes. The bath was again stirred for 1 hour at 280° C., the speed of stirring being decreased to 10 rpm. The copolyamide was collected in cold water. Same was perfectly transparent and hence homogeneous.

The product obtained had the following characteristics:
Tf: 239° C.
Tc: 191° C.
$\eta_{inh.}$: 1.02
Acid content in meq/kg 80.30
Amine content in meq/kg 32.5

EXAMPLE 4

Polycondensation beginning with the base reactants and employing acidolysis:

The process was carried out by producing, in a first stage, a homogeneous prepolymer having a 17% deficiency in diamine, in a 1 liter glass reactor equipped with a stainless steel sweeping anchor-type stirrer and with heating by means of a temperature-regulated oilbath.

| Charges: | |
|---|---|
| (i) Hexamethylenediamine: | 181 g (1.560 mols) |
| (ii) Adipic acid: | 205.6 g (1.408 mols) |
| (iii) Dimeric acid: | 280 g (0.4857 mol) |
| (iv) Hexamethylenediamine for adjustment: | 38.70 g (0.334 mol) |

181 g of hexamethylenediamine, 205.6 g of adipic acid and 280 g of dimeric acid were charged into the reactor at ambient temperature. The reactor was purged 5 times by placing it under vacuum and then introducing nitrogen. Thereafter, the apparatus was maintained under a slight stream of nitrogen. The reactor was thereafter immersed in the oilbath which was preheated to 140° C.; the mixture was stirred and the bath temperature was raised to 280°-285° C. over the course of 1 hour, 10 minutes. After stirring for 30 minutes at 280° C., the mixture was perfectly homogeneous and slightly viscous.

38.7 G of molten hexamethylenediamine were then introduced over 30 minutes in order to re-establish the stoichiometric ratio. The mixture was again stirred, for 1 hour at 280°-285° C. The viscosity of the mixture increased. The copolyamide obtained was collected by running it into cold water.

The copolymer had the following characteristics:
the product was transparent in the form of 3-5 mm diameter strands;
inherent viscosity: 0.90 dl/g
melting point determined by differential microcalorimetry: 235° C.
crystallization point upon cooling: 186° C.

EXAMPLE 5

Polycondensation in a homogeneous medium:

The process was carried out in the presence of N-methylpyrrolidone (NMP), which served as a solvent and made it possible to rapidly achieve a homogeneous mixture, if the reactants be employed in stoichiometric amounts.

The process was carried out in a 1 liter glass reactor equipped with a stainless steel sweeping anchortype stirrer and with heating by means of a temperature-regulated oilbath.

| Charges: | |
|---|---|
| (i) Adipic acid: | 205.6 g (1.408 mols) |
| (ii) Hexamethylenediamine: | 219.7 g (1.894 mols) |
| (iii) Dimeric acid: | 280 g (0.486 mol) |
| (iv) NMP: | 200 g |

The reactants were introduced at ambient temperature and the reactor was purged 5 times by placing it under vacuum and then introducing nitrogen. The apparatus was then maintained under a slight stream of nitrogen. The temperature was raised to 200° C., at which temperature the mixture became homogeneous. Same was then maintained for 30 minutes at 200°-210° C. to remove the greater part of the N.M.P. Thereafter, the temperature was raised to 275° C. over the course of 1 hour and was maintained thereat for 1 hour. A vacuum was then established over the course of 30 minutes to remove the N.M.P. Upon completion of the reaction, the mixture obtained was very viscous.

The copolyamide had the following characteristics:
melting point determined by differential microcalorimetry: 248° C.
crystallization point on cooling: 214° C.
inherent viscosity: 0.911 dl/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A flexible, homogeneous and transparent copolyamide comprising the polycondensation product of adipic acid, fatty acid dimer and hexamethylene diamine, wherein
   the molar fraction of adipic acid relative to the total amount of acid and the copolyamide melting point are such that the point obtained by plotting said molar fraction of adipic acid along the abscissa versus the copolyamide melting point along the ordinate falls within the area A B C D outlined on the accompanying Figure of Drawing, and wherein
   the molar ratio of adipic acid to the total amount of acid in the copolyamide ranges from about 0.5 to 0.99.

2. The copolyamide as defined by claim 1, said copolyamide having a flexural modulus from 1 to 10 times less than that of poly-(hexamethyleneadipamide).

3. The copolyamide as defined by claim 1, said copolyamide having a flexural modulus from 1 to 10 times less than that of polycaprolactam.

4. The copolyamide as defined by claim 1, said copolyamide having a flexural modulus no greater than that of polyundecanamide.

5. The copolyamide as defined by claim 1, the fatty acid which dimerizes comprises a saturated or unsaturated aliphatic monocarboxylic acid having from 8 to 24 carbon atoms.

6. The copolyamide as defined by claim 5, said fatty acid being selected from the group consisting of caprylic, pelargonic, capric, lauric, myristic, palmitic, isopalmitic, stearic, arachidic, behenic, lignoceric, oct-3-enoic, dodec-11-enoic, lauroleic, myristoleic, palmitoleic, gadoleic, cetoleic, linoleic, linolenic, eicosatetraenoic and chaulmoogric acid.

7. The copolyamide as defined by claim 5, said fatty acid comprising hydrogenated oleic and linoleic acids.

8. The copolyamide as defined by claim 1 or 5, said fatty acid dimer comprising a dimer fraction in excess of 95%, a monomer fraction of less than 0.5%, with the remaining fraction having a functionality of greater than 2.

9. The copolyamide as defined by claim 1 or 5, said molar ratio of adipic acid to total acid ranging from 0.95 to 0.90.

* * * * *